(12) United States Patent
Allott et al.

(10) Patent No.: US 9,151,424 B2
(45) Date of Patent: Oct. 6, 2015

(54) CONNECTOR FOR CONNECTING HOSE COUPLER TO DRAIN KNOB

(71) Applicant: Caterpillar Inc., Peoria, IL (US)

(72) Inventors: Mark T. Allott, Mapleton, IL (US); Brian J. Sutton, Edwards, IL (US)

(73) Assignee: Caterpillar Inc., Peoria, IL (US)

(*) Notice: Subject to any disclaimer, the term of this patent is extended or adjusted under 35 U.S.C. 154(b) by 168 days.

(21) Appl. No.: 14/062,388

(22) Filed: Oct. 24, 2013

(65) Prior Publication Data
US 2015/0115184 A1 Apr. 30, 2015

(51) Int. Cl.
| | |
|---|---|
| *F16L 37/138* | (2006.01) |
| *B01D 36/00* | (2006.01) |
| *F16L 55/07* | (2006.01) |
| *F16L 29/00* | (2006.01) |
| *B60K 15/03* | (2006.01) |

(52) U.S. Cl.
CPC ............. *F16L 37/138* (2013.01); *B01D 36/006* (2013.01); *F16L 29/002* (2013.01); *F16L 55/07* (2013.01); *B60K 2015/03453* (2013.01)

(58) Field of Classification Search
CPC ........... F16L 41/08; F16L 55/07; F16L 37/02; F16L 37/04; F16L 37/48; F16L 37/138; F16L 29/002; B01D 36/003; B01D 36/006; B01D 29/88; B01D 2201/302; B01D 2201/303; B01D 35/153; B01D 35/16; B01D 17/0214; B60K 2015/03453; Y10T 137/86332; F16K 27/07; F17C 13/00
USPC ........... 251/144, 149.5, 149.4, 146, 148, 150; 137/588; 210/248, 238, 234, 235
See application file for complete search history.

(56) References Cited

U.S. PATENT DOCUMENTS

| | | | | |
|---|---|---|---|---|
| 523,815 | A * | 7/1894 | Krix ............................. | 210/234 |
| 3,719,345 | A * | 3/1973 | Bridegum ..................... | 251/351 |
| 4,351,355 | A * | 9/1982 | Koller et al. ............. | 137/329.06 |
| 4,440,193 | A * | 4/1984 | Matheson ..................... | 137/558 |
| 4,451,069 | A * | 5/1984 | Melone ......................... | 285/86 |
| 4,611,627 | A * | 9/1986 | Eidsvoog et al. ............. | 137/588 |
| 4,893,651 | A * | 1/1990 | Herman et al. ............... | 137/588 |
| 5,144,978 | A * | 9/1992 | Brown et al. ................. | 137/588 |
| 5,219,188 | A * | 6/1993 | Abe et al. ..................... | 285/93 |
| 5,322,624 | A * | 6/1994 | Rogers et al. ................. | 210/232 |
| 5,547,565 | A * | 8/1996 | Biere et al. ................... | 210/86 |
| 5,580,099 | A * | 12/1996 | Eaton ........................... | 285/35 |
| 5,749,606 | A * | 5/1998 | Lu et al. ....................... | 285/86 |
| 6,258,269 | B1 * | 7/2001 | Knight .......................... | 210/248 |
| 6,338,506 | B1 * | 1/2002 | Kubota et al. ................ | 285/319 |

(Continued)

FOREIGN PATENT DOCUMENTS

GB 2344542 6/2000

*Primary Examiner* — Kevin Murphy
*Assistant Examiner* — David Colon Morales

(57) ABSTRACT

A connector is provided for connecting a hose coupler to a drain knob. The connector includes a base plate, an appendage, and a lateral projection. The base plate includes an opening configured to allow engagement of the hose coupler to the base plate at a first side thereof. The appendage extends axially from a second side of the base plate and is disposed about the opening. The appendage has a substantially oblong profile in a first plane disposed parallel to the base plate. Further, the appendage has a convex face configured to abut a concave portion of a sidewall of the drain knob. The lateral projection extends radially inward from the appendage. The lateral projection is configured to abut an end face of the drain knob.

20 Claims, 5 Drawing Sheets

(56) References Cited

U.S. PATENT DOCUMENTS

| | | | |
|---|---|---|---|
| 6,749,233 B2* | 6/2004 | Ohya | 285/322 |
| 7,229,105 B2* | 6/2007 | Broersma | 285/399 |
| 8,020,580 B2 | 9/2011 | Ahuja et al. | |
| 2005/0230300 A1 | 10/2005 | Kato | |
| 2007/0016166 A1* | 1/2007 | Thistle | 604/533 |
| 2007/0034560 A1* | 2/2007 | Janik et al. | 210/248 |
| 2008/0223461 A1* | 9/2008 | Gerwin et al. | 137/588 |
| 2009/0101595 A1* | 4/2009 | Allott et al. | 210/767 |
| 2009/0114287 A1* | 5/2009 | Abdalla et al. | 137/15.05 |
| 2010/0253075 A1* | 10/2010 | Werth | 285/331 |
| 2012/0091051 A1 | 4/2012 | Schweitzer et al. | |
| 2013/0233400 A1* | 9/2013 | Dworatzek et al. | 137/15.01 |

* cited by examiner

CONNECTOR FOR CONNECTING HOSE COUPLER TO DRAIN KNOB

TECHNICAL FIELD

The present disclosure relates to a connector, and more particularly to the connector for connecting a hose coupler to a drain knob.

BACKGROUND

U.S. Publication No. 2012/0091051 (hereinafter referred to as 051' publication) discloses a filter with a drain valve wherein, the drain valve mounts within an opening of a housing of the filter. The drain valve has a knob mounted to a valve member thereof. At least one locking structure is disposed between the knob and the valve member to mechanically lock the knob to the valve member. The 051' publication discloses that such a configuration reduces the likelihood of the knob becoming inadvertently dislodged during operation.

However, the 051' publication and many other assemblies previously known in the art disclose little or no means for connecting the knob to a hose coupler. Although some conventional assemblies employ connectors for connecting the hose coupler to the knob, such connectors are typically formed with constructions that accomplish a weak connection between the hose coupler and the knob. Therefore, it may be possible in some cases for the hose coupler to inadvertently detach from the knob thus allowing spillage of fluid from a port of a tank.

SUMMARY

In one aspect, the present disclosure provides a connector for connecting a hose coupler to a drain knob. The connector includes a base plate, an appendage, and a lateral projection. The base plate includes an opening configured to allow engagement of the hose coupler to the base plate at a first side thereof. The appendage extends axially from a second side of the base plate and is disposed about the opening. The appendage has a substantially oblong profile in a first plane disposed parallel to the base plate. Further, the appendage has a convex face configured to abut a concave portion of a sidewall of the drain knob. The lateral projection extends radially inward from the appendage and is configured to abut an end face of the drain knob.

In another aspect, the present disclosure provides a drain assembly for a tank. The drain assembly includes a drain port secured to the tank. The drain assembly further includes a drain knob coupled to the drain port, and a connector coupled to the drain knob. The connector includes a base plate, an appendage, and a lateral projection. The base plate includes an opening configured to allow engagement of a hose coupler to the base plate at a first side thereof. The appendage extends axially from a second side of the base plate and is disposed about the opening. The appendage has a substantially oblong profile in a first plane disposed parallel to the base plate. Further, the appendage has a convex face configured to abut a concave portion of a sidewall of the drain knob. The lateral projection extends radially inward from the appendage and is configured to abut an end face of the drain knob.

In another aspect, the present disclosure provides a connector for connecting a hose coupler to a drain knob. The connector includes a circular base plate including an opening configured to allow engagement of the hose coupler to the base plate at a first side thereof. The connector further includes at least three upright appendages extending axially from a second side of the circular base plate and radially disposed about the opening. The appendages have a substantially oblong profile in a first plane disposed parallel to the base plate wherein a distance between adjacent appendages is lesser than a major-axis length of the appendages in the first plane. Each of the appendages has a convex face configured to abut a concave portion of a sidewall of the drain knob. The connector further includes at least one lateral projection extending radially inward from each of the appendages. The lateral projections are configured to abut an end face the drain knob and span partway across the end face corresponding to the concave portions of the drain knob.

Other features and aspects of this disclosure will be apparent from the following description and the accompanying drawings.

DETAILED DESCRIPTION

Figure 1:
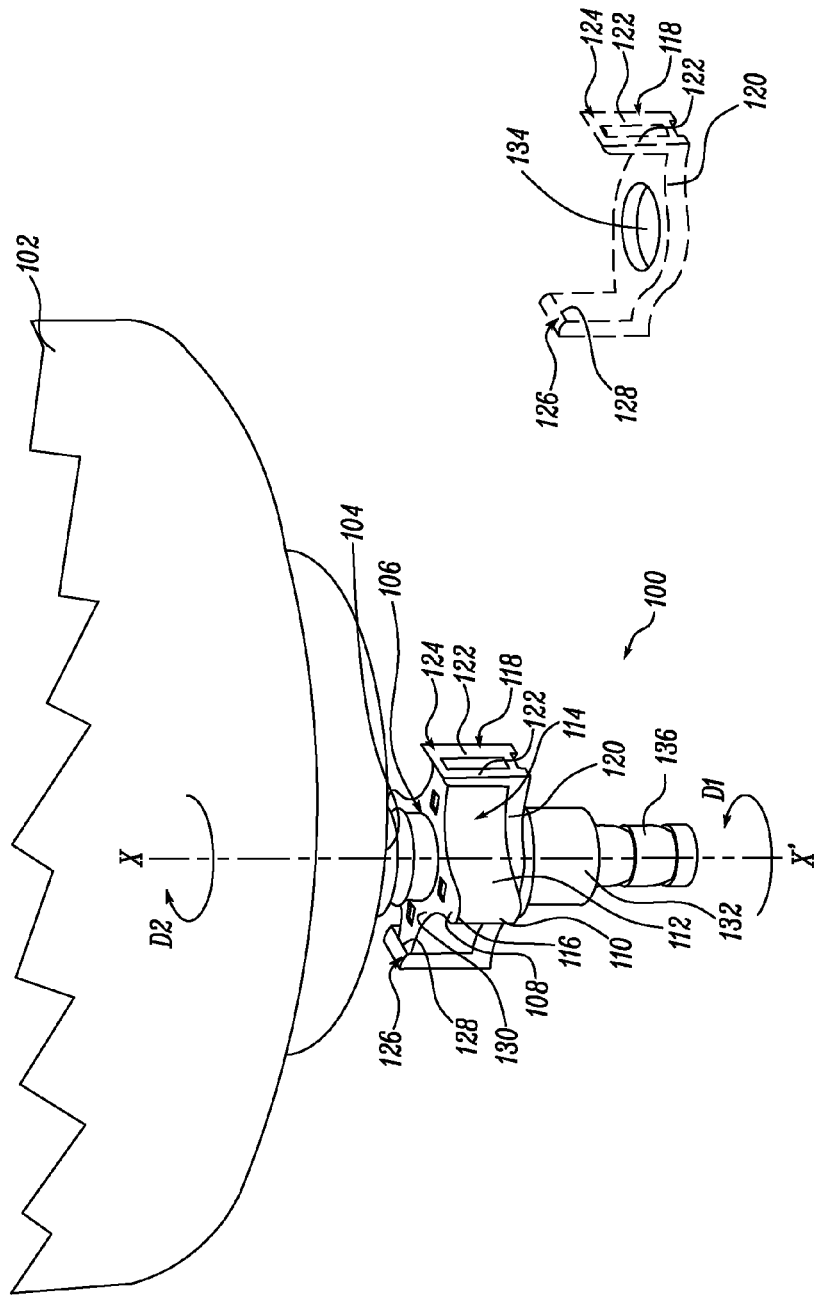
FIG. 1 is a perspective view of a previously known assembly for connecting a hose coupler to a drain knob.

FIG. 1 illustrates a perspective view of a previously known assembly for connecting a hose coupler to a drain knob. The previously known assembly 100 may be associated with a tank 102 configured to store fluid therein, for example, oil, fuel or any other liquid commonly known in the art. The assembly 100 includes a drain port 104, and a drain knob 106. The drain port 104 may be affixed to the tank 102 and may be configured to serve as an outlet for the fluid present in the tank 102. The drain knob 106 may include a plurality of arms 108 extending radially outwards. The arms 108 are formed to define alternating convex portions 110 and concave portions 112 on a sidewall 114 of the drain knob 106. The convex portions 110 may be disposed at an end 116 of the arms 108 while the concave portions 112 may be defined between adjacent arms 108. The drain knob 106 may be rotatable in a first direction $D_1$ or a second direction $D_2$ about axis X-X' for draining the fluid out of the tank 102 or for stopping an egress of the fluid from the tank 102. The first and second directions $D_1$, $D_2$, disclosed herein, may be, for example, a clockwise direction and a counter-clockwise direction respectively.

The assembly 100 may further include a connector 118. The connector 118 may be of a type conventionally known in the art. Therefore, an example of the connector 118 from conventionally known connectors is illustrated in FIG. 1. The connector 118 may include a pair of laterally extending ledges 120. Each of the ledges 120 includes a pair of resiliently deflectable fingers 122 upstanding from an end 124 thereof. The connector 118 further includes a shoulder 126 extending between the pair of fingers 122. The shoulder 126 may include an inner surface 128 configured to abut an end face 130 of the drain knob 106. The connector 118 may be employed to connect a hose coupler 132 to the drain knob 106 via an opening 134 disposed centrally on the connector 118. The hose coupler 132 may allow a hose pipe (not shown) to be releasably attached thereon. In the exemplary assembly 100 of FIG. 1, the hose coupler 132 shown includes a barbed portion 136 to allow connection with the hose pipe.

Figure 2:
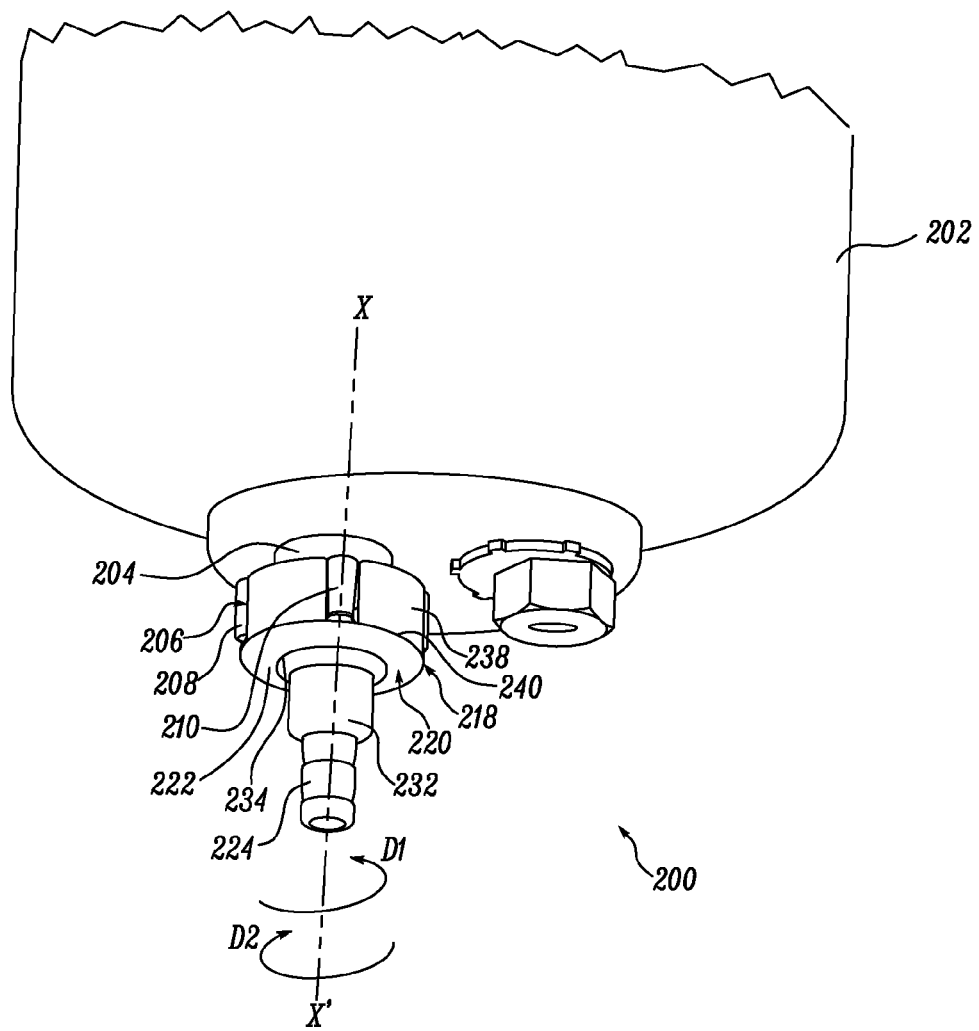
FIG. 2 is a perspective view of a drain assembly in accordance with an embodiment of the present disclosure.

The present disclosure relates to a connector for connecting a hose coupler to a drain knob. A drain assembly 200 in accordance with an embodiment of the present disclosure is illustrated in FIG. 2. Explanation pertaining to the drain assembly 200 of the present disclosure will be made in conjunction with FIGS. 2-5 of the accompanying drawings. Reference to elements that are similar between the assembly 100 of FIG. 1 and the drain assembly 200 of FIGS. 2-5 will be made with similar numerals/alpha-numerals increased by 100.

Referring to FIG. 2, the drain assembly 200 of the present disclosure is shown associated with a tank 202. The tank 202 may be, for example, an oil tank, a fuel tank, a filter housing or any other housing structure configured with a drain feature for draining of a fluid therefrom. The drain assembly 200 includes a drain port 204 secured to the tank 202. The drain port 204 may be, for example, an extruded hard-case pipe secured to the tank 202 by methods commonly known in the art. Some methods for securing the drain port 204 to the tank 202 may be, but not limited to, welding, brazing, soldering, or riveting. Additionally, one or more sealing devices (not shown) may be used to seal a joint between the drain port 204 and the tank 202.

Figure 3:
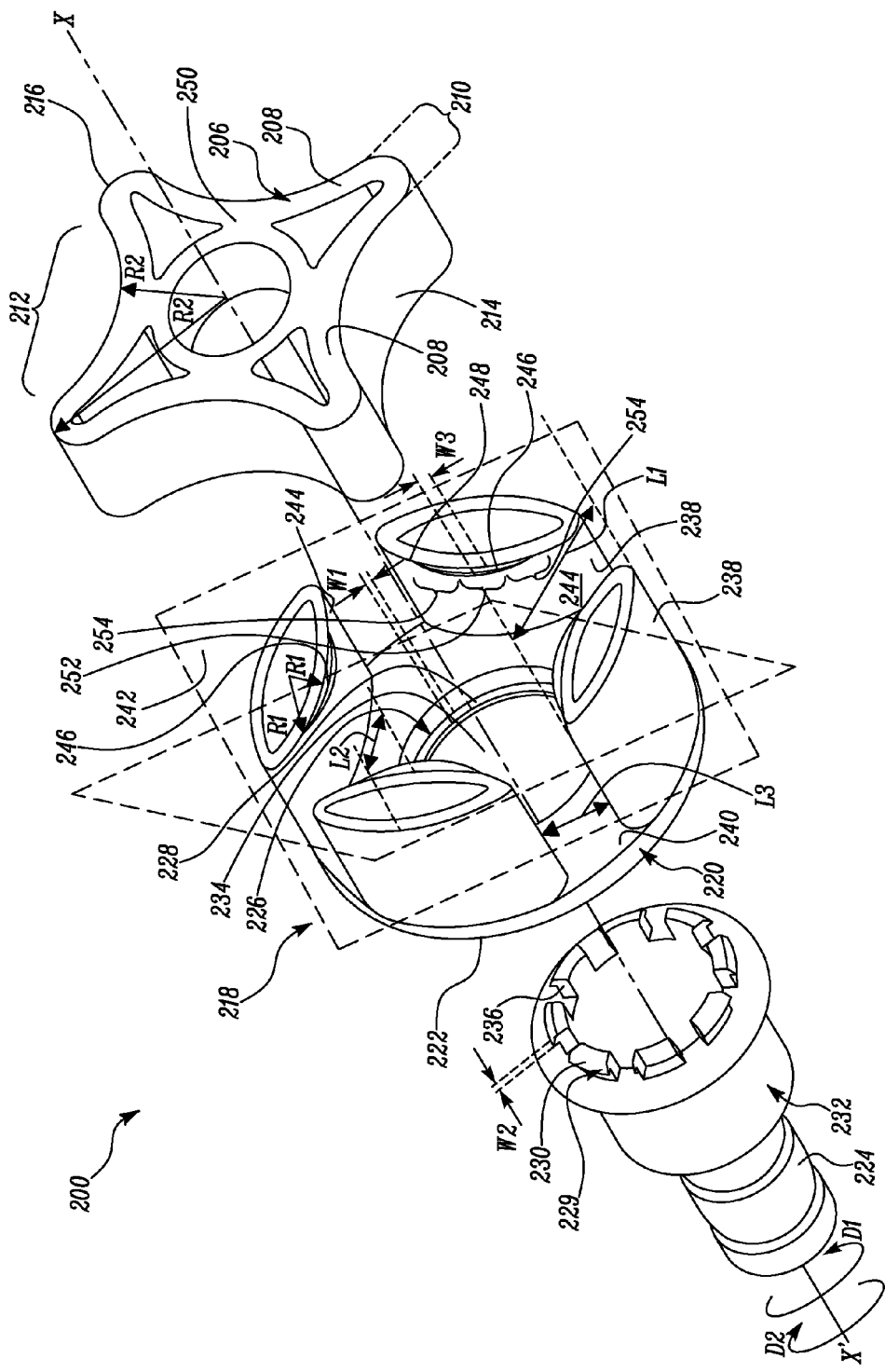
FIG. 3 is an exploded perspective view of the drain assembly of FIG. 2.
Figure 4:
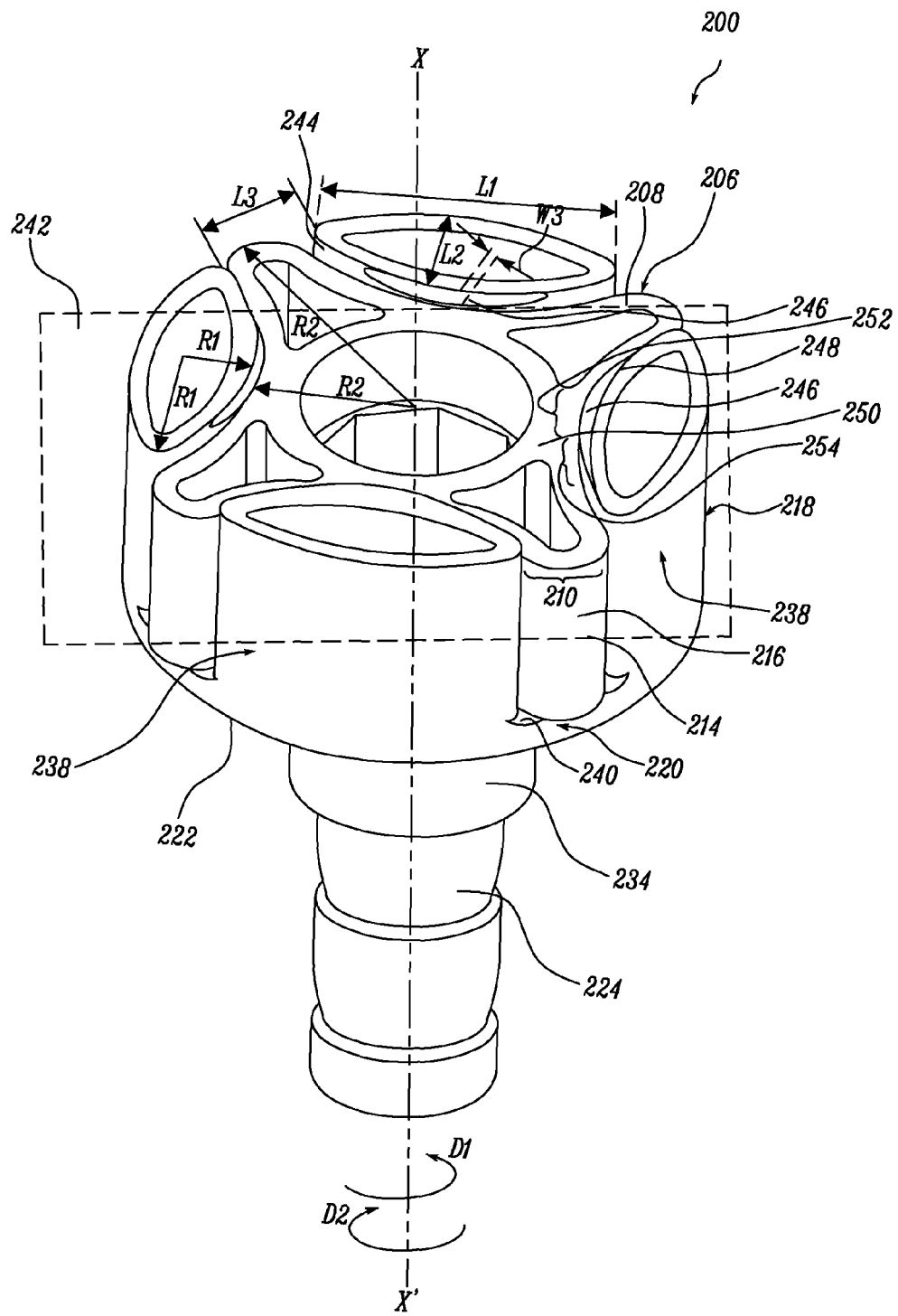
FIG. 4 is a front elevation view of the drain assembly of FIG. 2.

The drain assembly 200 further includes a drain knob 206 coupled to the drain port 204, explanation to which will be made in conjunction with FIGS. 3-4. Referring to FIGS. 3-4, as in the case with the drain knob 106 of FIG. 1, the drain knob 206 of the present disclosure may similarly include a plurality of arms 208 extending radially outwards. The arms 208 are formed to define alternating convex portions 210 and concave portions 212 on a sidewall 214 of the drain knob 206. The convex portions 210 may be disposed at an end 216 of the arms 208 while the concave portions 212 may be disposed between adjacent arms 208. Turning back to FIG. 2, the drain knob 206 may be rotatable in a first direction $D_1$ or a second direction $D_2$ about axis X-X' for draining the fluid out of the tank 202 or for stopping an egress of the fluid from the tank 202. The first and second directions $D_1$, $D_2$, disclosed herein, may be, for example, a clockwise direction and a counter-clockwise direction respectively.

The drain assembly 200 further includes a connector 218 coupled to the drain knob 206. The connector 218 includes a base plate 220. In an embodiment of the present disclosure, the base plate 220 may be a circular base plate. However, in alternative embodiments, other shapes commonly known in the art may be used to form the base plate 220. Some shapes that may be used to define the base plate 220 are, but not limited to, square, rectangle, and oval. It is to be noted that the circular base plate disclosed herein is merely exemplary in nature and hence, non-limiting of this disclosure. Moreover, the shape of the base plate 220 may change depending upon specific requirements of an application.

The base plate 220 includes an opening 234 configured to allow engagement of a hose coupler 232 to the base plate 220 at a first side 222 thereof. In an embodiment as shown in FIG. 3, the opening 234 is centrally located on the base plate 220. However, in alternative embodiments the opening 234 may be located at any location on the base plate 220. Further, as shown in FIG. 3, the opening 234 is circular in shape. However, in alternative embodiments, the opening 234 may be of other shapes corresponding to the hose coupler 232. Some commonly known shapes in the art that can be used to form the opening 234 may be, but not limited to, square, rectangle, and oval shapes. Therefore, the opening 234 may be suitably sized and shaped to receive the hose coupler 232 therein for engagement with the base plate 220.

Further, as shown in FIG. 3, the hose coupler 232 may include a barbed portion 224 configured to allow connection of a hose pipe thereon. In the embodiment of FIG. 3, the hose coupler 232 is an elongated hose coupler. In other embodiments, the hose coupler 232 may be an L-shaped hose coupler, or an angled hose coupler having a bent portion therein. The shape and configuration of the hose coupler 232 is merely exemplary in nature and hence, non-limiting of this disclosure. The specific shapes and/or configurations of the hose coupler 232 may change depending on specific requirements of an application.

In an embodiment as shown in FIG. 3, the base plate 220 further includes an interlocking feature 226 configured to releasably engage the hose coupler 232 to the base plate 220. The interlocking feature 226 may be additionally configured to allow movement of the hose coupler 232 and the drain knob 206 independent of each other. Therefore, rotation of the drain knob 206 about axis X-X' may not entail or cause rotation of the hose coupler 232 and/or the hose pipe connected thereto.

In one embodiment, the interlocking feature 226 may include a counter-bore 228 defined adjacent to the opening 234. A width $W_1$ of the counter-bore 228 is configured to correspond to a width $W_2$ of teeth 229 provided on the hose coupler 232. Each of the teeth 229 on the hose coupler 232 may be include a slant face 230 and a flat face 236. During assembly, the hose coupler 232 may be positioned proximal to the first side 222 of the base plate 220 and forced within the opening 234 such that the slant faces 230 bias the teeth 229 inward and allow the teeth 229 to slip within the opening 234 of the base plate 220. Thereafter, the flat faces 236 of the teeth 229 may abut the counter-bore 228 and accomplish releasable engagement of the hose coupler 232 with the base plate 220. Therefore, the slant faces 230 of teeth 229 are configured to assist the hose coupler 232 in coupling with the connector 218.

Although the preceding embodiment discloses a counter-bore 228 for the interlocking feature 226, a person having ordinary skill in the art may acknowledge that any type of interlocking feature may be contemplated and formed in any suitable portion of the base plate 220 in order to releasably engage the hose coupler 232 to the base plate 220. Therefore, it is to be noted that the counter-bore 228, disclosed herein, is merely exemplary in nature and hence, non-limiting of this disclosure. Some other structures well known in the art may include, but are not limited to, internal threads formed in the base plate 220 for screwing the hose coupler 232 therein, or clamps pivotally connected to the first side 222 of the base plate 220 for clamping the hose coupler 232 to the base plate 220.

The drain assembly 200 further includes an appendage 238 extending axially from a second side 240 of the base plate 220 and disposed about the opening 234. In an embodiment of the present disclosure, it is contemplated that at least three appendages 238 are radially disposed about the opening 234. In the particular embodiment of FIGS. 3-4, four appendages 238 are shown radially disposed about the opening 234. Further, in an embodiment, the appendages 238 may be hollow appendages. The hollow appendages 238, disclosed herein, may be configured to provide resiliency to the appendages 238 to flex during assembly and/or operation.

Each of the appendages 238 has a substantially oblong profile in a first plane 242 disposed parallel to the base plate 220. Although, it is disclosed herein that the appendages 238 have a substantially oblong profile, it must be noted that a scope of the terms "substantially oblong" extends to imply that profiles substantially close to an oblong profile may alternatively be used in lieu of the oblong profile while forming the appendages 238. Therefore, it may be envisioned to impart profiles such as, but not limited to, a reniform profile (i.e. curved leaf-profile or a kidney-shaped profile), an ellipse, or even a circular profile while forming the appendages 238. A person having ordinary skill in the art may thus acknowledge that several profiles and/or shapes may be contemplated while forming the appendages 238 such that the appendages 238 are configured to correspond to a profile and/or shape and/or contour of the drain knob 206 without deviating from the scope of the present disclosure.

As illustrated in FIGS. 3-4, the appendages 238 include a convex face 244 configured to abut the concave portions 212 of the sidewall 214 of the drain knob 206. As is evident from FIGS. 3-4, the convex face 244 of the appendages 238 are suitably sized and shaped by way of a major-axis length $L_1$ and a minor-axis length $L_2$ of the appendages 238 measured in the first plane 242. As known to one having ordinary skill in the art, the terms "major-axis length" and "minor-axis length" represent a length of an imaginary straight line drawn to represent maximum and minimum diameters of any one of the adjacent substantially oblong appendages 238. Therefore, progressively varying radii $R_1$ of the appendages 238 exuded by the major-axis length $L_1$ and the minor-axis length $L_2$ configures the appendages 238 to conform with progressively varying radii $R_2$ of the sidewall 214 of the drain knob 206 such that the convex face 244 of the appendages 238 abut the concave portions 212 on the drain knob 206.

In an embodiment as shown in FIGS. 3-4, a distance $L_3$ between adjacent appendages 238 is less than the major-axis length $L_1$ of the appendages 238. In one embodiment, successive distances $L_3$ between adjacent appendages 238 may be equal. In another embodiment, successive distances $L_3$ between adjacent appendages 238 may be unequal.

The connector 218 further includes at least one lateral projection 246 extending radially inward from the appendage 238. The lateral projections 246 are positioned at an end 248 of the appendage 238 opposite the base plate 220 and are configured to abut an end face 250 of the drain knob 206. In an embodiment of the present disclosure, the lateral projections 246 extend along a majority of the convex face 244 of the appendages 238. Therefore, the lateral projections 246 are configured to span partway across the end face 250 corresponding to the concave portions 212 of the drain knob 206. Further, in an embodiment, a width $W_3$ of the lateral projections 246 measured radially inward is in a range of approximately 1 millimeter to 15 millimeters. In one exemplary embodiment, the width $W_3$ of the lateral projections 246 may be 3 millimeters. In another exemplary embodiment, the width $W_3$ of the lateral projections 246 may be 5 millimeters. Furthermore, as shown in FIGS. 3-4, the width $W_3$ of the lateral projections 246 may vary from a mid-region 252 of the lateral projections 246 to ends 254 of the lateral projections 246 respectively.

INDUSTRIAL APPLICABILITY

Figure 5:
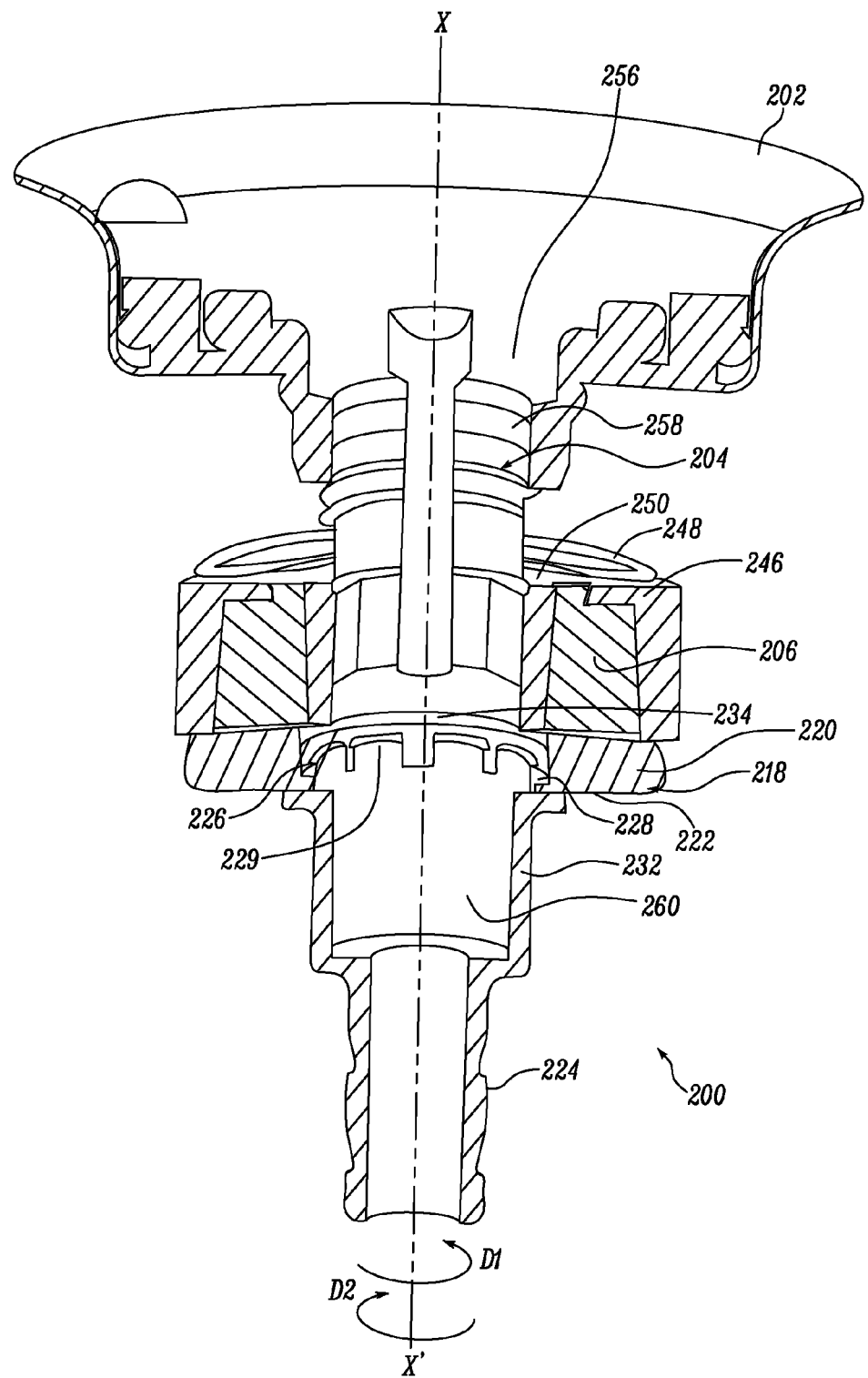
FIG. 5 is a sectional view of the drain assembly in accordance with an embodiment of the present disclosure.

A working of the drain assembly 200 will be described in connection with FIG. 5. Referring to FIG. 5, a sectional view of the drain assembly 200 and the tank 202 is shown. The connector 218 is shown disposed between the drain port 204 and the hose coupler 232. An opening 256 of the tank 202 is disposed in axial alignment with an opening 258 in the drain port 204, the opening 234 on the connector 218, and an opening 260 of the hose coupler 232. The fluid from the tank 202 may be drained out of the tank 202 by rotating the drain knob 206 in the first direction $D_1$ or the second direction $D_2$ about the axis X-X'. As is evident from FIGS. 2 and 4, parts of the convex portions 210 of the drain knob 206 extend outwards between adjacent appendages 238. In order to operate the drain knob 206, an operator may grip the drain knob 206 and/or the convex portions 210 of the drain knob 206 and apply a rotational force about axis X-X'. Therefore, the fluid may be drained from the tank 202 or alternatively, an egress of the fluid from the tank 202 may be stopped by rotation of the drain knob 206.

Previously known assemblies, for example, the assembly 100 of FIG. 1, typically employed connectors 118 including resiliently deflectable fingers 122 and shoulders 126. The fingers 122 and shoulders 126 were of substantially thin cross-sections when compared to an overall size of the connector 118 and/or the drain knob 106. Further, the fingers 122 and shoulders 126 may be inadequately voluminous to withstand operational forces associated with or corresponding to the size of the drain knob 106. Therefore, the fingers 122 and the shoulders 126 may impart a fragile construction to such connectors 118. Such assemblies 100 when manufactured from materials such as plastic, rubber or other materials commonly known in the art may be susceptible to deterioration and/or cracking at areas of minimum thicknesses upon prolonged periods of operation. Further, under application of force while operating the drain knob 106 or during assembly of the connector 118 onto the drain knob 106, the connector 118 may snap and fail thereby leading to detachment of the connector 118 and/or the hose coupler 132 from the drain knob 106 of the assembly 100.

Furthermore, in operation, the fingers 122 of the previously known connectors 118 are configured to abut the convex portions 110 of the drain knob 106, while the shoulders 126 are configured to abut the end face 130 of the drain knob 106. It may be evident from the drain knobs 106, 206 of FIGS. 1 and 2 that a surface area of the end faces 130 and 250 corresponding to the convex portions 110 and 210 of the drain knob 106 is lesser than a surface area of the end faces 130 and 250 corresponding to the concave portions 112 and 212. Therefore, with respect to the previous known assembly 100, the fingers 122 and the shoulders 126 interfacing with the convex portions 110 and the end face 130 corresponding to the convex portions 110 may provide a weak securement force of the assembly 100 on the drain knob 106. Thus, the connector 118 and/or the hose coupler 132 may detach from the drain knob 106 of the assembly 100.

In some cases, the tanks 102, 202 may be configured to store hazardous and/or toxic fluids therein. Further, an operator may operate the drain knobs 106, 206 by hand. Failure of the previously known assemblies 100 may result in spillage of the hazardous and/or toxic fluids. Such spillage may be detrimental to the operator's health.

Furthermore, when employed on machines, such as but not limited to, off-highway trucks, tractors, and graders, such spillage may entail consequential downtimes and decrease productivity of the machine. In some cases, the connector 118 may also have a tendency to fall off and get lost from such machines due to vibrations encountered during operation of the machines. Such occurrences may incur additional expenses towards replacement of the assemblies 100 and/or replacement of the fluid. Further, the spillage of the fluid may cause pollution and may pose other environmental concerns.

With regards to the connector 218 of the present disclosure, a construction of the base plate 220, the appendages 238, and the lateral projections 246 present therein has a robust construction. Further, when manufactured from materials such as plastic, rubber or other materials commonly known in the art, the connector 218 may mitigate effects such as deterioration and/or cracking due to the voluminous construction of the base plate 220, the appendages 238, and the lateral projections 246 and the absence of areas of minimum thicknesses present in previously known connectors 118. Therefore, the base plate 220 of the connector 218 offers a secure connection with a drain hose while the lateral projections 246 together with the appendages 238 and the base plate 220 allow firm securement of the drain knob 206 therebetween. Further, the connector 218 of the present disclosure may be configured to withstand application of operational forces for prolonged periods of time. Furthermore, under application of excessive forces on the drain knob 206 and/or the connector 218, the connector 218 may be less likely to fail as compared to the previously known connectors 118.

With use and implementation of the present connector 218, a possibility of the connector 218 becoming inadvertently dislodged or detaching from the drain knob 206 is minimized. Therefore, the connector 218 may reduce a risk of spillage of the fluid from the tank 202. Further, the present connector 218 may allow independent movement of the drain knob 206 and the hose coupler 232 while also providing improved grip to the operator in operating the drain knob 206. Since the present connector 218 reduces the risk of inadvertently dislodging or detaching the hose coupler 232 from the drain knob 206, operators may be inclined to perform routines such as, but not limited to, draining and/or other allied functions on the tank and the fluid therein with the help of the connector 218. In some cases, these routines may be required in order to maintain the machines correctly. Therefore, the connector 218 may allow the operators to accomplish required functions on the machine with improved ease, lesser time, and with minimum risk of spillage of the fluid. Moreover, the connector 218 of the present disclosure may prevent pollution and other environmental concerns associated with spillage.

While aspects of the present disclosure have been particularly shown and described with reference to the embodiments above, it will be understood by those skilled in the art that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:

1. A connector for connecting a hose coupler to a drain knob, the connector comprising:
   a base plate comprising an opening configured to allow engagement of the hose coupler to the base plate at a first side thereof;
   an appendage extending axially from a second side of the base plate and disposed about the opening, the appendage having a substantially oblong profile in a first plane disposed parallel to the base plate, the appendage having a convex face configured to abut a concave portion of a sidewall of the drain knob; and
   a lateral projection extending radially inward from the appendage, the lateral projection configured to abut an end face of the drain knob.

2. The connector of claim 1, wherein the lateral projections are configured to span partway across the end face corresponding to the concave portions of the drain knob.

3. The connector of claim 1, wherein the appendage includes at least three appendages radially disposed about the opening, wherein a distance between adjacent appendages is less than a major-axis length of the appendages in the first plane.

4. The connector of claim 1, wherein the connector is made of a thermoplastic material.

5. The connector of claim 1, wherein the base plate further comprises an interlocking feature configured to releasably engage the hose coupler to the base plate.

6. The connector of claim 5, wherein the interlocking feature includes a counter-bore defined adjacent to the opening, and wherein a width of the counter-bore is configured to correspond to a width of teeth provided on the hose coupler.

7. The connector of claim 1, wherein the opening is centrally located on the base plate.

8. The connector of claim 1, wherein the lateral projections are positioned at an end of the appendage opposite the base plate.

9. A drain assembly for a tank, the drain assembly comprising:
   a drain port secured to the tank;
   a drain knob coupled to the drain port; and
   a connector coupled to the drain knob, the connector comprising:
      a base plate comprising an opening configured to allow engagement of a hose coupler to the base plate at a first side thereof;
      an appendage extending axially from a second side of the base plate and disposed about the opening, the appendage having a substantially oblong profile in a first plane disposed parallel to the base plate, the appendage having a convex face configured to abut a concave portion of a sidewall of the drain knob; and
      a lateral projection extending radially inward from the appendage, the lateral projection configured to abut an end face of the drain knob.

10. The drain assembly of claim 9, wherein the appendage includes at least three appendages radially disposed about the opening, and wherein a distance between adjacent appendages is less than a major-axis length of the appendages in the first plane.

11. The drain assembly of claim 9, wherein a width of the lateral projection measured radially inward is in a range of about 1 millimeter to 15 millimeters.

12. The drain assembly of claim 9, wherein the connector is made of a thermoplastic material.

13. The drain assembly of claim 9, wherein the base plate further comprises an interlocking feature configured to releasably engage the hose coupler to the base plate.

14. The drain assembly of claim 13, wherein the interlocking feature includes a counter-bore defined adjacent to the opening, and wherein a width of the counter-bore is configured to correspond to a width of teeth provided on the hose coupler.

15. A connector for connecting a hose coupler to a drain knob, the connector comprising:
   a circular base plate comprising an opening configured to allow engagement of the hose coupler to the base plate at a first side thereof;
   at least three upright appendages extending axially from a second side of the circular base plate and radially disposed about the opening, the appendages having a substantially oblong profile in a first plane disposed parallel to the base plate wherein a distance between adjacent appendages is lesser than a major-axis length of the appendages in the first plane, each of the appendages having a convex face configured to abut a concave portion of a sidewall of the drain knob; and at least one lateral projection extending radially inward from each of the appendages, the lateral projections configured to abut an end face the drain knob and span partway across the end face corresponding to the concave portions of the drain knob.

16. The connector of claim 15, wherein the appendages are hollow appendages.

17. The connector of claim 15, wherein the opening is centrally located on the base plate.

18. The connector of claim 15, wherein the lateral projections are positioned at an end of the appendage opposite the base plate.

19. The connector of claim 15, wherein the base plate further comprises an interlocking feature configured to releasably engage the hose coupler to the base plate.

20. The connector of claim 19, wherein the interlocking feature includes a counter-bore defined adjacent to the opening, and wherein a width of the counter-bore is configured to correspond to a width of teeth provided on the hose coupler.

* * * * *